United States Patent
Beniwal et al.

(10) Patent No.: US 12,248,872 B1
(45) Date of Patent: Mar. 11, 2025

(54) MACHINE LEARNING FRAMEWORK FOR PERSONALIZED CLOTHING COMPATIBILITY

(71) Applicant: Amazon Technologies, Inc., Seattle, WA (US)

(72) Inventors: Anurag Beniwal, Redmond, WA (US); Meet Taraviya, Los Angeles, CA (US); Yen-Liang Lin, Aliso Viejo, CA (US); Larry Davis, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 836 days.

(21) Appl. No.: 17/486,666

(22) Filed: Sep. 27, 2021

Related U.S. Application Data (60) Provisional application No. 63/231,574, filed on Aug. 10, 2021.

(51) Int. Cl.
  G06N 3/08    (2023.01)
  G06F 18/21   (2023.01)
  G06Q 10/083  (2023.01)

(52) U.S. Cl.
  CPC ............... *G06N 3/08* (2013.01); *G06F 18/21* (2023.01); *G06Q 10/083* (2013.01)

(58) Field of Classification Search
  CPC ......... G06Q 10/083; G06F 18/21; G06N 3/08
  See application file for complete search history.

(56) References Cited

PUBLICATIONS

Chen et al. "POG: Personalized Outfit Generation for Fashion Recommendation at Alibaba iFashion", arXiv:1905.01866v3 [cs.IR] May 20, 2019, pp. 9.*
Amazon Personal Shopper webpage, as archived Oct. 5, 2019, https://web.archive.org/web/20191005210352/https://www.amazon.com/b?ie=UTF8&node=19190471011.
He et al. "FashionNet: Personalized Outfit Recommendation with Deep Neural Network" 2018.
Jawanpuria et al. "A Unified Framework for Structured Low-rank Matrix Learning" In Proceedings of the 35th International Conference on Machine Learning (Proceedings of Machine Learning Research, vol. 80) 2018.
Lu et al. "Learning Binary Code for Personalized Fashion Recommendation" 2019.
Lin et al. "Fashion Outfit Complementary Item Retrieval" Mar. 4, 2020, in CVPR.
McAuley et al. "Image-based Recommendations on Styles and Substitutes" 2015.
Tan et al. "Learning Similarity Conditions Without Explicit Supervision" 2019.
Taraviya et al. "Personalized Compatibility Metric Learning", KDD'21, Aug. 14-18, 2021, Association for Computing Machinery.

(Continued)

*Primary Examiner* — Li Wu Chang
(74) *Attorney, Agent, or Firm* — Knobbe, Martens, Olson & Bear, LLP (57) ABSTRACT

Systems and methods are described for recommending pairs or sets of clothing items for an individual to wear together, including learning a compatibility metric personalized to each individual. A framework is used to learn compatibility that is personalized to the user based on initial item feedback that may be received from the user via user interfaces that prompt the user to indicate whether the user would wear certain clothing items together and/or individually.

18 Claims, 6 Drawing Sheets

(56) References Cited

PUBLICATIONS

Vasileva et al. "Learning Type-Aware Embeddings for Fashion Compatibility", 2018.
Veit et al. "Learning Visual Clothing Style with Heterogeneous Dyadic Co-occurrences", 2015.
Xu et al. "POG: Personalized Outfit Generation for Fashion Recommendation at Alibaba iFashion", 2019.
Zhang et al. "Deep Learning Based Recommender System", ACM Comput. Surveys 1:1 (Jul. 2018).
Zheng et al. "Personalized Fashion Recommendation from Personal Social Media Data: An Item-to-Set Metric Learning Approach", May 2020.

* cited by examiner

MACHINE LEARNING FRAMEWORK FOR PERSONALIZED CLOTHING COMPATIBILITY

PRIORITY AND INCORPORATION BY REFERENCE

Any and all applications for which a foreign or domestic priority claim is identified in the Application Data Sheet as filed with the present application are hereby incorporated by reference under 37 CFR 1.57.

This application claims benefit of U.S. Provisional Patent Application No. 63/231,574, entitled "MACHINE LEARNING FRAMEWORK FOR PERSONALIZED CLOTHING COMPATIBILITY," filed Aug. 10, 2021, which is hereby incorporated by reference in its entirety.

BACKGROUND

Fashion compatibility is subjective and depends on several factors including the preference of a customer for the individual items, and what the customer likes to wear together. Depending on various factors like profession, location and age, compatibility could mean different things to different customers. As an example, for a particular customer, a black shirt worn with white jeans is more compatible than a pink shirt worn with white jeans, but for another customer the opposite could be true. Accordingly, reliance on an objective definition of clothing compatibility (such as which colors and styles of clothing pair well with another color and style of clothing) or reliance on the opinion of human stylists in insufficient to accurately predict whether a particular person would like to wear any particular clothing items together.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Generally described, aspects of the present disclosure relate to recommending a pair or set of clothing items to a user to be worn together based on an automated determination that the particular user is likely to think that the recommended items are compatible or go well together from a fashion or aesthetic perspective. Approaches described herein for recommending sets of items to a particular user to be worn together (e.g., personalized and compatible item pairings) may be used to implement personalized styling programs, suggest additional clothing purchases to a user, assemble an outfit or set of items to be shipped to a user, and/or other uses. Past approaches have focused on learning generic fashion compatibility and also on personalization in fashion. However, recommending pairs of items that a customer would like to wear together is less studied as it involves learning a compatibility metric personalized to each customer.

Described herein is a machine learning framework to learn compatibility that is personalized to a particular customer. In some embodiments, aspects of the disclosure utilize a customer dependent subspace learning framework where attention weights of subspaces are learnt using customer representations. The approach was evaluated on compatibility data provided directly by customers. The disclosed approach outperforms previous non-personalized approaches in predicting compatibility preferences of customers (in other words, an approach that learns a common compatibility metric for all customers). In addition, the significance of data collected directly from customers was compared to that of data collected from human stylists in predicting item compatibility for customers. In some embodiments, aspects of the present disclosure may be used in connection with a subscription service that provides personalized styling using machine learning, optionally with humans in the loop, to recommend sets of items to customers.

Example User Interfaces

Figure 1A:
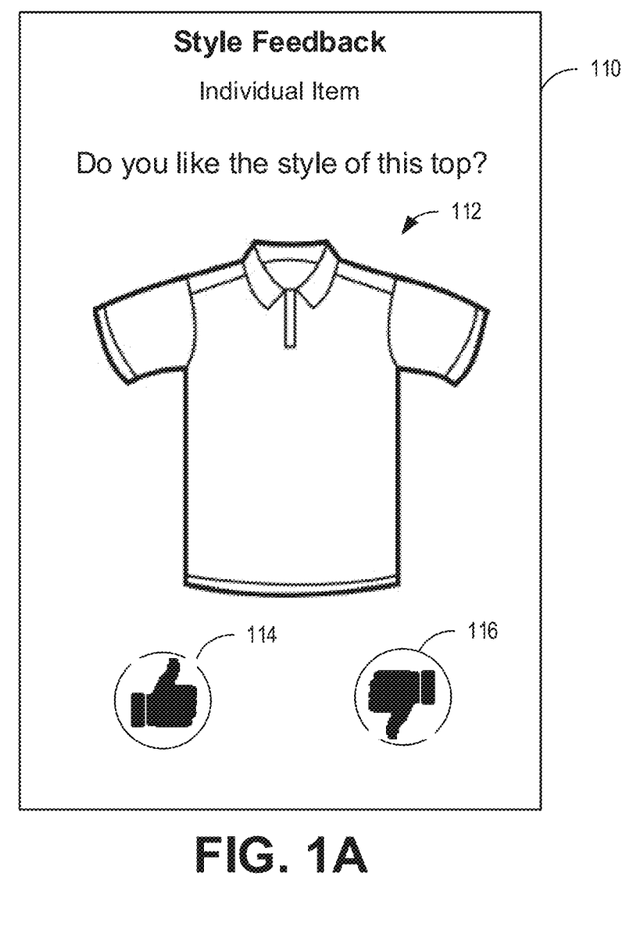
FIGS. 1A and 1B illustrate example user interfaces for obtaining user feedback regarding clothing items.
Figure 1B:
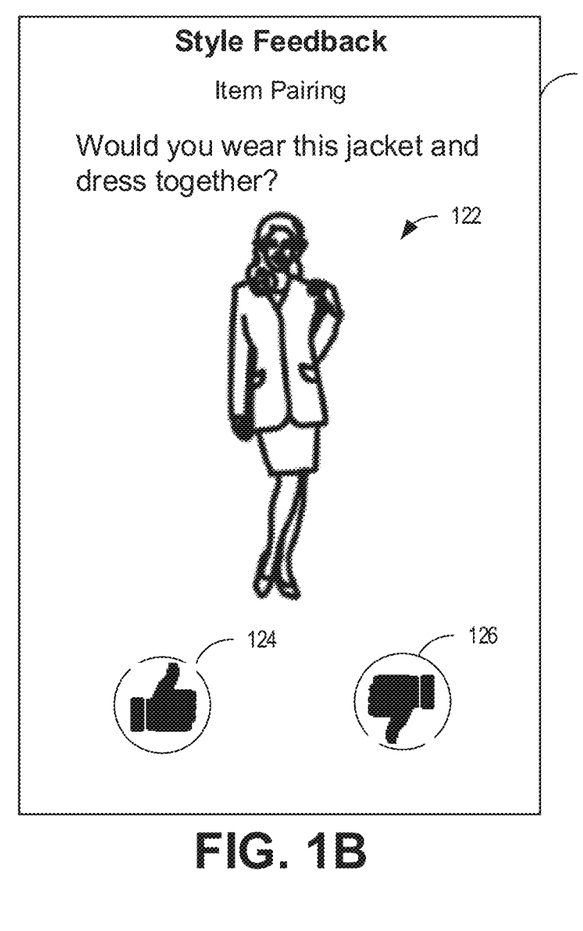

FIGS. 1A and 1B illustrate example user interfaces for obtaining user feedback regarding clothing items. As shown, user interfaces 110 and 120 may prompt a user to provide feedback on items, which enables the system described herein to learn the style likes and dislikes of the user. The user interfaces may be presented for display, for example, by a user computing device 503 (further described below), such as based on user interface data received over a network from computing system 502 (further described below).

With respect to FIG. 1A, the user interface 110 presents a shirt 112 (which may be presented, for example, as a photograph of a particular shirt that is purchasable and/or deliverable by an operator of an electronic commerce system), along with instructions for the user to indicate whether the user likes the style of the shirt 112. The user may select option 114 (illustrated as a thumbs up graphical icon in this embodiment) to indicate that the user likes the style of the shirt 112, or may select option 116 (illustrated as a thumbs down graphical icon in this embodiment) to indicate that the user dislikes the style of the shirt 112. Selection of either option 114 or 116 may result, in some embodiments, with storing the like or dislike indication in a data store in association with the user and automatically presenting another item in the user interface 110 to obtain additional feedback from the user on more items.

With respect to FIG. 1B, the user interface 120 presents an outfit or item pairing 122, shown as a jacket and dress, along with instructions for the user to indicate whether the user would wear the two items together (e.g., whether the user considers the two items compatible with each other as part of an outfit). In other embodiments, the item pairing 122 may be presented as two separate images, one of the jacket and one of the dress. The user may select option 124 to indicate that the user would wear the two items together, or may select option 126 to indicate that the user would not wear the two items together. Selection of either option 124 or 126 may result, in some embodiments, with storing the like or dislike indication in a data store in association with the user and automatically presenting another item pairing in the user interface 120 to obtain additional feedback from the user on more item pairs.

In the illustrated embodiments of FIGS. 1A and 1B, a thumbs up/down interaction mechanism is employed, though in other embodiments other input types may be provided (such as numeric ratings, swipe gestures previously defined to represent a like or dislike indication, etc.). In other embodiments, feedback on items and/or item pairs from a user may be collected in a less explicit manner, such as by analyzing user interaction with various items in an electronic catalog (such as viewing items, adding items to shopping carts or wish lists, purchasing items, saving items for later viewing, etc.). It will be appreciated that, in some embodiments, the system may present user interfaces such as user interfaces 110 and/or 120 to hundreds or thousands of users in order to collect training data for the machine learning models described herein.

User feedback provided via user interfaces 110 and 120, as well as other user interfaces, is used to improve understanding of the particular person's style and compatibility preferences, resulting in better recommendations. Users can vote or otherwise provide feedback on clothing items individually as well as pairs of items. Votes or other feedback input on individual items are used by the system to learn representations of users and items to predict a user's preferences on individual items, such as specific clothing items. Votes or other feedback input on pairs of items (such as a shirt and pants worn together) are used to learn compatibility of pairs of items for each user. The data collected from item feedback user interfaces described above, in addition to other data sources, is used to train one or more recommendation models, as further described below. These models, along with inputs from fashion experts or administrative users in some embodiments, may be used to curate a personalized set of clothing recommendations for the user (such as a package of two or more clothing items mailed to the customer to wear together). In some such embodiments, users can choose what they want to try and only be charged for items they keep after trying on the items.

Overview and Distinctions of Disclosed Framework

There are various prior approaches attempting to address the problem of recommending compatible items, but most learn a common compatibility metric for everyone, ignoring personal tastes of individual customers. Most commonly, these models are trained on open source datasets or datasets labelled by fashion experts, and do not take into account customer level feedback on compatibility. In instances where prior approaches attempt to address personalized compatibility, co-purchase is often used as a proxy for compatibility, which is prone to adding noise to the model as people might buy things together without any intent to wear them together. Described herein, in accordance with some embodiments, is a subspace attention-based architecture that projects item images into multiple embedding subspaces. Different subspaces represent different notions of compatibility and the importance of each subspace in learning a customer's compatibility metric is determined by its attention weight. The attention weights are dependent on customer embeddings that are learned by the system using matrix completion-like algorithms, in some embodiments. The number of subspaces may be a hyperparameter in the model.

Unique aspects of the present disclosure include, among other things, (1) a novel architecture that takes into account user-side information to project item embedding into multiple subspaces using attention to learn a personalized metric of compatibility for each customer, and (2) a two stage training process that learns customer representations from item-level preferences in a first stage and then uses these learned customer representations along with pairwise preference data to predict pairwise compatibility in a second stage.

Existing approaches to complementary item recommendation can generally be categorized into two types. The first type of approach addresses the pairwise similarities between fashion items. For example, others have proposed a Siamese network to learn item compatibility using co-purchase or co-view information. Instead of computing the similarity in a single space, other recent approaches have explored learning sub-space embeddings to capture different notions of similarities. One prior approach is to learn type-aware embeddings to compute item similarities in sub-spaces.

The second type of approach models the higher-order relations of items in an outfit, such as modelling an outfit as a sequence of items and using a bidirectional LSTM model to compute the compatibility score. One prior approach includes using graph convolutional networks (GCN) to model item relationship in an outfit. These and other previously known methods generally consider a generic compatibility model and do not take user preferences into account to personalize compatibility. In contrast, the methods and framework described herein utilize a two-stage approach where the system first learns customer representation based (potentially millions) of instances of customer feedback on individual items. The system may then use these customer representations along with customer preferences on pairs of items to learn a personalized metric of fashion compatibility for each customer. At a customer level, preferences on pairs of items are relatively fewer as compared to preferences on individual items (for example, on an average, there may be five times as many preferences on individual items than on pairs of items, as the ratings for individual items are typically easier to collect or more frequently collected in various manners). Therefore, single item preferences help in reliably learning customer representation and with the learnt customer representations it becomes possible to learn a personalized compatibility metric with relatively fewer pairwise preferences available.

Various personalized complementary methods have been proposed to incorporate personalized information into a complementary model. These previous methods often use random negative images (or outfits) when learning the embeddings. However, these negative images may not be the "true" negatives to the anchor images (outfits). In practice, good negative images are important to train an accurate model. Therefore, aspects of the present disclosure include gathering user ratings on pairs of items (such as via the user interface shown in FIG. 1B) to obtain positive and negative image pairs for learning embeddings.

According to some embodiments of the present disclosure, the complementary relationship is considered at the pairwise level, due to its simplicity and scalability to different configurations of product types. There may be a different number of categories in an outfit rather than a fixed number of categories. A pairwise model is more suitable in this case, but it will be appreciated that this approach can be easily extended to outfit level, which may include three or more items.

For case of description, illustrative methods will be described below with respect to embodiments in which the various illustrated components are implemented by a single computing system, such as computing system 502, but this is not intended to be limiting. It will further be appreciated that references herein to a model, such as a machine learning model, may interchangeably refer to discrete components of the machine learning framework described herein (such as a model for extracting image features, a model for generating a user-specific embedding, etc.), multiple illustrated components collectively, or the framework as a whole (such as the entire framework illustrated in FIGS. 4A and 4B).

Figure 2:
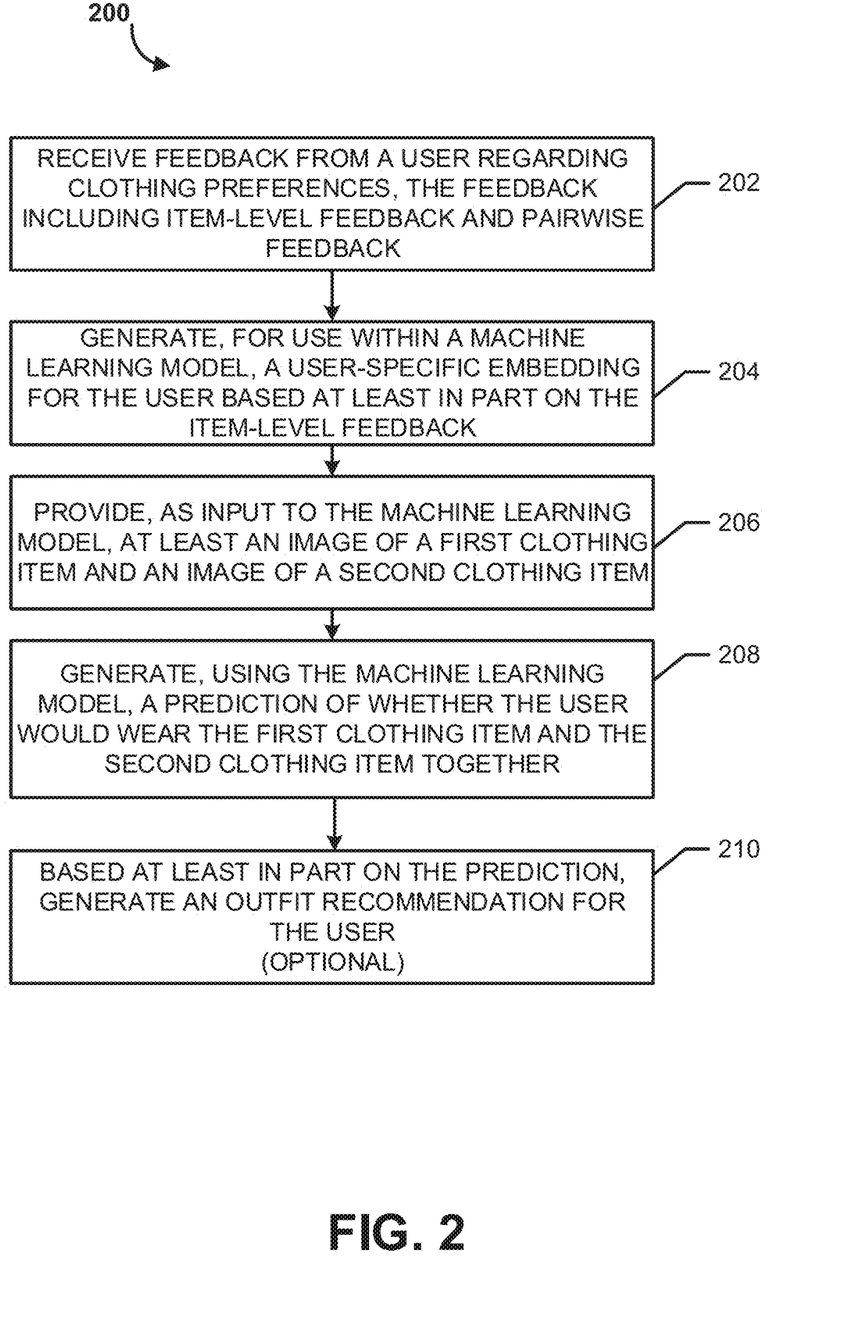
FIG. 2 is a flow diagram of an illustrative method for using a machine learning framework as described herein to predict whether a user would wear particular clothing items together.

FIG. 2 is a flow diagram of an illustrative method 200 for using a machine learning framework as described herein to predict whether a user would wear particular clothing items together. The method 200 may be implemented by one or more computing systems, such as computing system 502 that will be described below with respect to FIG. 5. In some embodiments, a computing system other than the system that trains the machine learning model or framework may later utilize the trained model to generate pairwise ratings or predictions. In other embodiments, the same computing system may train and later use the machine learning model or framework.

The method 200 begins at block 202, where the system 502 may receive feedback from a user regarding clothing preferences, the feedback including item-level feedback and pairwise feedback. The item feedback may be received, in some embodiments, via user interfaces such as those described above with respect to FIGS. 1A and 1B. In other embodiments, the feedback for a particular user may only include item-level feedback (as opposed pair-level or outfit-level feedback), while pair-level or outfit-level feedback may be received from other users for purposes of model training, as will be discussed below.

At block 204, the system 502 may generate, for use within a machine learning model, a user-specific embedding for the user based at least in part on the item-level feedback. The process and framework for generating a user-specific embedding will be described in more detail below, such as with respect to FIG. 4A.

At block 206, the system 502 may provide, as input to a previously trained machine learning model (e.g., trained based on many users' item pairing feedback), an image of a first clothing item and an image of a second clothing item for which a pairwise rating is to be determined by the machine learning model. In some embodiments, the system may be configured to select a number of different potential item pairings in order to pass the items (such as images, metadata, properties, attributes and/or other information regarding the items) through the machine learning model to identify a pair having the highest pairwise rating with respect to the user (such as in order to identify an item pairing or outfit to recommend to the user). In other embodiments, the pairing may be a curated pairing, such as a pairing selected by a human stylist or another user, which the system checks to consider whether a particular user's tastes or item compatibility preferences may differ from the stylist or other user (e.g., the stylist may be of the opinion that the items pair well together, but a particular user may disagree).

At block 208, the system 502 may generate, using the machine learning model, a prediction of whether the user would wear the first clothing item and the second clothing item together. As will be further described below, this prediction, score or rating may be generated using a combination of features extracted from the images of the input items, as well as the user-specific embedding generated above at block 204. In other embodiments, attributes or features of the items may be provided as the input to the model, rather than images from which features are extracted or identified.

At block 210, the system 502 may, in some embodiments, generate an outfit recommendation for the user based at least in part on the prediction. For example, if the pairwise rating generated for a given item pairing is above a predetermined threshold and/or is higher than other pairings analyzed by the system model with respect to the particular user (depending on the embodiment), the system may send a notification or present a user interface to the user recommending purchase or viewing of the items in the pair as being suitable for the user to wear together. In other embodiments, rather than presenting a recommendation to the user, the system may identify the first and second clothing items as an item pair to be automatically included in an upcoming shipment of clothing to the user, such as in connection with a personalized styling program, or may generate a notification to a stylist or other administrative user associated with the system that the pairing either should or should not be included as a curated pairing/outfit for the user (e.g., based on whether the pairwise rating is above a threshold for recommendation or below a threshold for acceptability of the pairing). In the illustrated embodiment, the method 200 ends after block 210.

Figure 3:
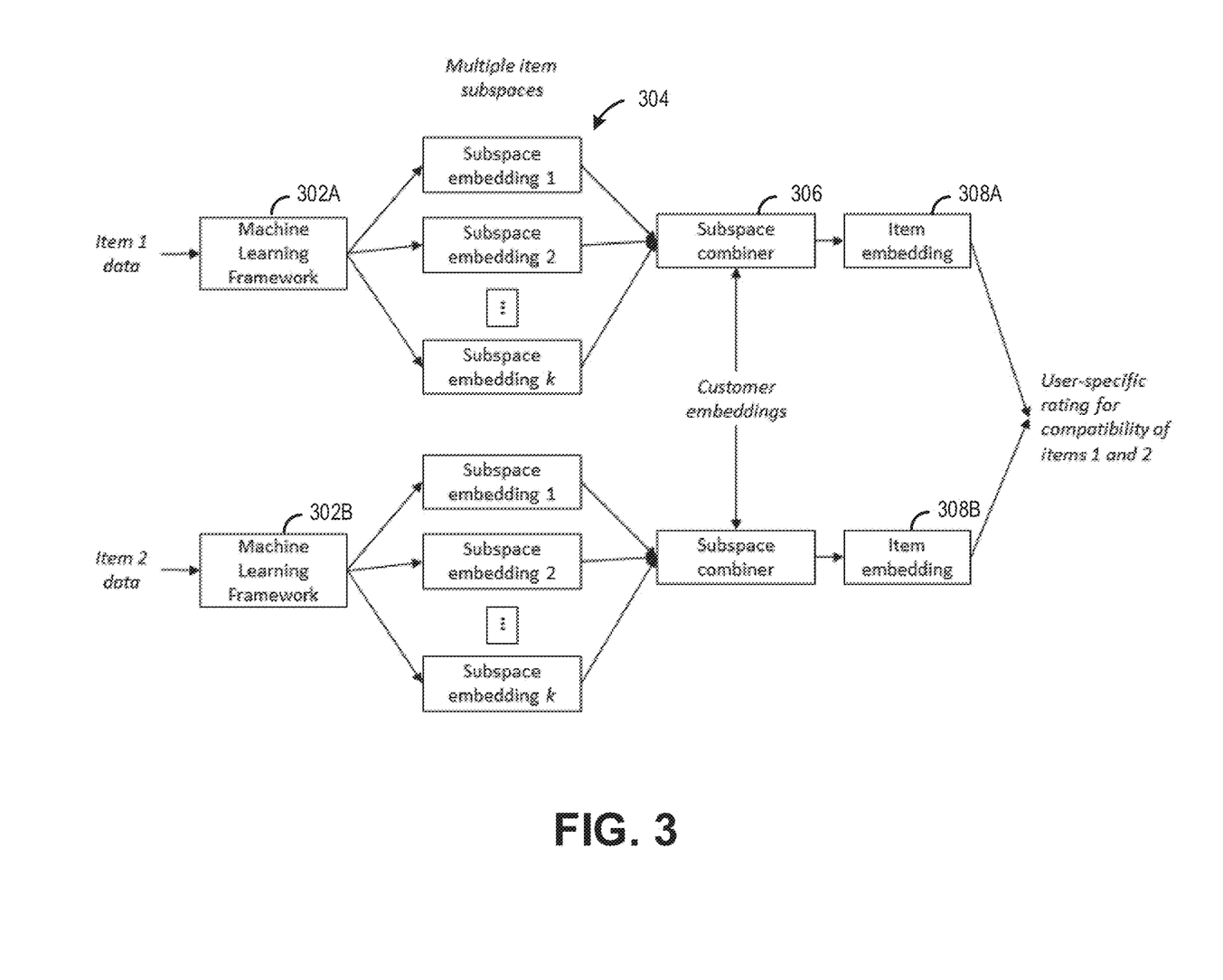
FIG. 3 illustrates an example network architecture and data flow for generating a user-specific pairwise rating for a pair of items, such as clothing items, according to some embodiments.

FIG. 3 illustrates an example network architecture and data flow for generating a user-specific pairwise rating for a pair of items, such as clothing items, according to some embodiments. A single computing system may implement or include each of the illustrated components of FIG. 3, in some embodiments. In other embodiments, one computing system may implement certain aspects or components, while another computing system implements other aspects or components. FIG. 3 may be considered to illustrate a high level abstraction of a machine learning framework for generating a pairwise rating, according to some embodiments, while FIGS. 4A and 4B that will be described subsequently provide more detail on specific implementations of the high level components shown in FIG. 3. While specific components of FIG. 3 may be referenced individually as a machine learning framework or machine learning model (such as machine learning framework 302A), it will be appreciated that each of the components illustrated in FIG. 3 may also be considered to collectively make up a machine learning framework.

As shown in FIG. 3, the computing system, such as computing system 502, may implement a machine learning framework that is configured to receive one or more images of a first item and one or more images of a second item (and/or data or metadata regarding the input items other than images of those items) as input in a given instance or forward pass through the machine learning model or framework. As shown, the image(s) and/or data for a first item may be provided to machine learning framework 302A, while the image(s) and/or data for a second item may be provided to a second instance of the same machine learning framework 302B. The images and/or data will then begin to be processed either sequentially or in parallel through respective instances of the machine learning model components as shown. For example, as will be further described below with respect to FIG. 4A, the machine learning framework 302A, such as a convolutional neural network, may extract or generate features from the image of the first item, from which the model then generates multiple subspace embeddings 304 for the first item. The subspace embeddings 304 may correspond to different notions of compatibility that are dependent on the customer, and are combined in a customer-specific or user-specific manner at subspace combiner 306 based on provided customer embedding or user embedding data. The model then uses the resulting item embeddings 308A (for the combination of the first item and a particular user) and 308B (for the combination of the second item and the particular user) to generate a user-specific, pairwise rating for compatibility of the first and second items.

In some embodiments, the user or customer embedding for a particular user may be generated in real time in association with a request to analyze a given item pairing by the machine learning model in association with a particular user. In other embodiments, the user embedding for a particular user may be generated in advance, such as on a batch basis, periodically, and/or when new item feedback information is received from the particular user. In such embodiments, a data store may store a number of different users' user-specific embeddings for use by the machine learning framework. In other embodiments, the machine learning framework may be trained in a manner that incorporates the user-specific embedding generation within particular layers or portions of the framework.

As will be further described below with respect to FIG. 4A, the machine learning framework may generate a feature embedding space for the input items based at least in part on features extracted from the item images and the user embedding. For example, the framework may pass the image of the first clothing item and the image of the second clothing item through a convolutional neural network to extract image feature vectors, then apply masks to the image feature vectors to generate multiple subspace embeddings 304. The framework may then generate subspace attention weights based at least in part on the user-specific embedding, then generate the final embeddings 308A and 308B as a weighted sum of the subspace embeddings based in part on the subspace attention weights. The model may then ultimately output a user-specific pairwise rating for the first and second input items indicating whether the particular user is likely to find that the first and second item are items that the user would like wear together. For example, based on one or more loss functions applied by the framework, the items' distance from each other in the feature embedding space of item embedding 308A and item embedding 308B may generally reflect the extent to which the user would find the items compatible with each other (such as for wearing together).

While FIG. 3 is shown with an example of two items being passed as input to determine compatibility of those two items, this is for illustrative purposes only. In other embodiments, in the inference stage after training the model, a single item could be provided as input to the model (such as an item that a particular user expressed interest in), and the model could compare that item's embedding to a number of other items' embeddings to identify a closest item in the personalized embedding space. The closest or other nearby item in the personalized embedding space may then be recommended as a compatible item to the user. In other embodiments, rather than generate a fully customized or personalized subspace for a particular user (such as by weighting subspaces based on a customer embedding), the system may select a particular preexisting subspace (from a number of predetermined subspaces) to use for a particular customer.

Figure 4A:
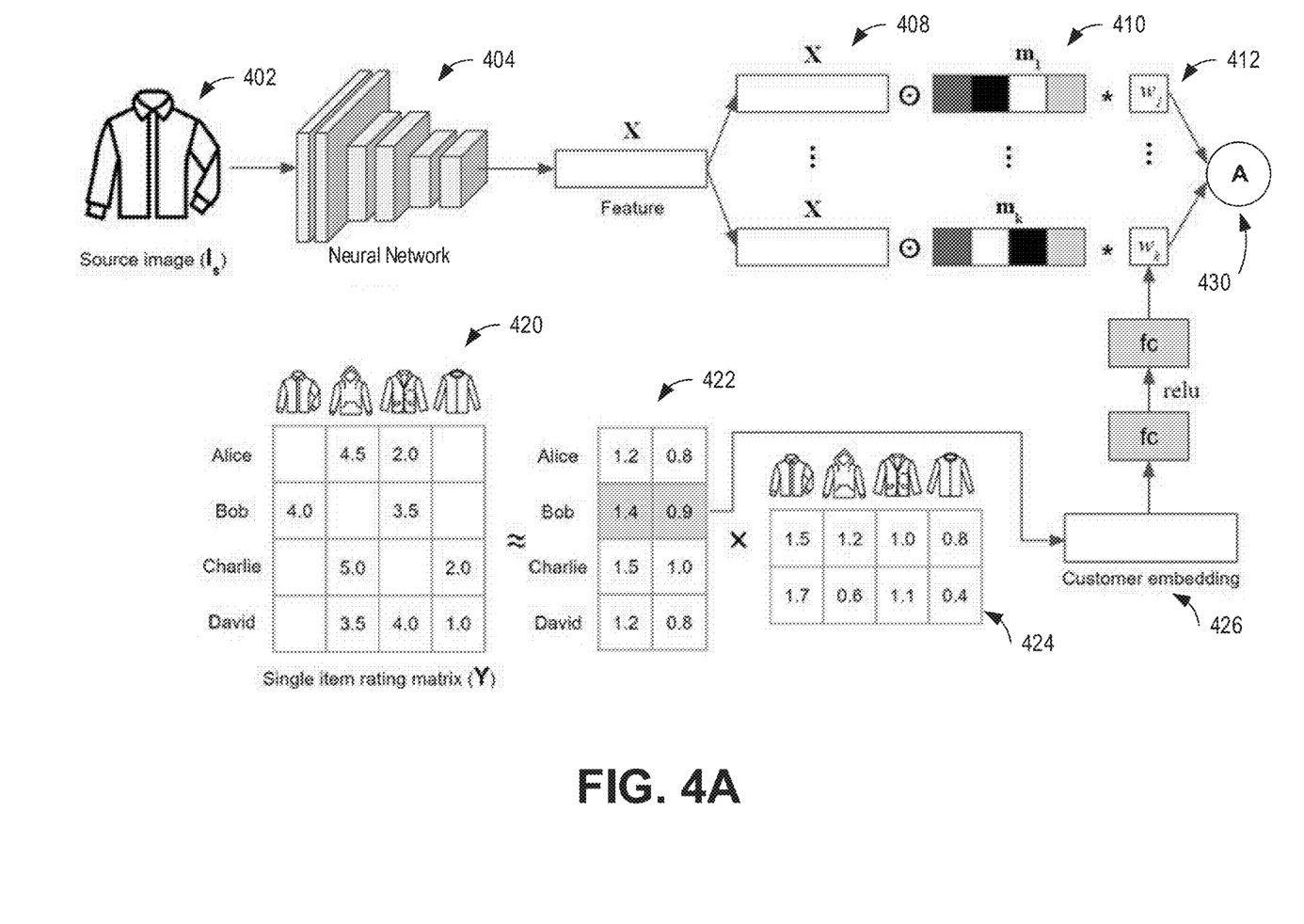
FIGS. 4A and 4B graphically depict an embodiment of a personalized subspace attention network.
Figure 4B:
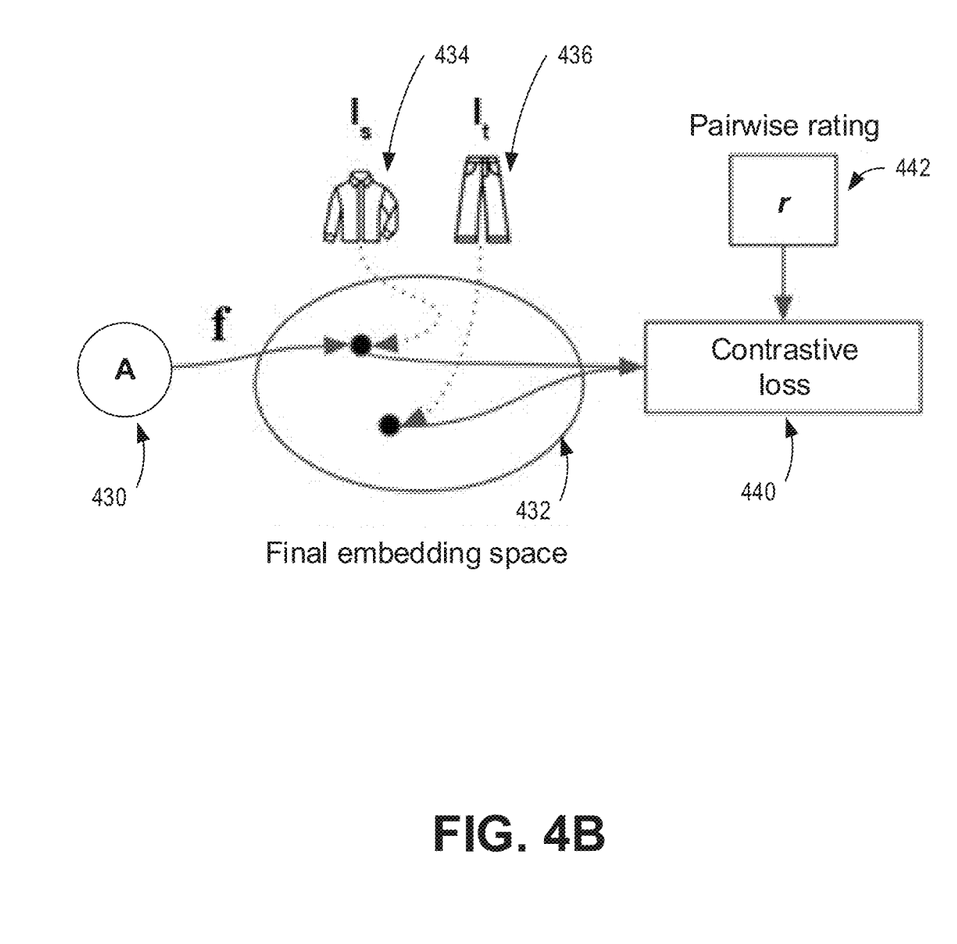

FIGS. 4A and 4B graphically depict an embodiment of a personalized subspace attention network (which may be referenced as "PSA-Net" in some instances herein). It will be appreciated that the illustrated framework of FIGS. 4A and 4B could be considered one example of the framework described at a higher level with respect to FIG. 3 above.

In the illustrated embodiment of FIG. 4A, a single item image 402 is passed as input to a neural network 404, such as convolutional neural network. While a single item's image is shown, it will be appreciated that two or more items' images may be passed in parallel through the neural network 404. For example, for a pairwise rating determination for a particular pair of items, the two items of the pair may both have a representative image passed through the neural network 404 to generate or extract features for each item individually. The extracted features may be represented as image feature vectors 408. A set of masks 410 are applied to the image feature vectors to generate multiple subspace embeddings. The subspace embeddings may correspond to different notions of compatibility that are dependent on the customer. The customer embedding 426 (discussed further below), which may be specific to a single customer, is fed into a sub-network to predict the attention weights 412, which in turn select the appropriate subspace embeddings for the final embedding computation 432 of FIG. 4B (block 430, shown in both FIGS. 4A and 4B, represents a point of connection between what is shown in FIG. 4A and continued in FIG. 4B). The selected subspace embeddings for a particular user may generally encode the compatibility relationship that is personalized to that user. For example, items 434 and 436 may represent two input clothing items, which may receive a relatively high pairwise rating 442 if they are near each other in the final embedding space 432 based on a contrastive loss function 440. The details of the subspace attention network and loss are described further below.

The disclosed network is trained in one embodiment using contrastive loss on pairs of items. It may take in a training sample $\{<A_i, B_i, c, r_i>i \in [n]\}$, where $r_i$ is the customer (or user) c's rating on compatibility of items corresponding to the pair $<A_i, B_i>$ of images. The loss of the $i^{th}$ data point may be calculated using the positive distance $d(A_i, B_i)$ and the label $r_i$. Details of the contrastive loss will be described further below.

As shown in the bottom portion of FIG. 4A, the customer embedding 426 may be generated in some embodiments based on a single item rating matrix 420, which may indicate various users' ratings or other feedback on various items at the individual item level. As shown, the matrix 420 may be somewhat sparsely populated, such that not every user provided feedback on every item or on the same items as other users. A user matrix 422 and item matrix 424 may be derived or generated based on the single item rating matrix 420 in order to then generate the customer embedding 426 for a particular user, as will be further discussed below.

Customer Embeddings—Additional Details

In some embodiments, customer representation or customer embedding is learned using a class of algorithms called matrix completion. Other algorithms that could be used include Partial Dual (a matrix completion algorithm) and/or a neural network to learn customer style (which may be referenced herein as Stynet). Input to these algorithms may include customer preferences on individual items (such as upvotes/down votes via item feedback user interfaces), item features (visual features, brand, color, and/or other attributes) and/or other customer-side information. These embeddings may be used to compute attention weights in the personalized compatibility model. In some embodiments customer embeddings for each customer may be learned using matrix factorization on customer preference data on individual items. In other embodiments, customer embeddings can be learned end-to-end within the machine learning framework.

(a) Partial Dual

Partial Dual is a class of matrix completion algorithm where a low rank representation W of the rating matrix Y is learnt. W can be factorized into a customer (or user) matrix and an item embedding matrix. The customer embedding matrix is used to compute subspace attention weights for use in the machine learning network. $Y \in \mathbb{R}^{d \times T}$ is the rating matrix on individual items and $L: \mathbb{R}^{d \times T} \times \mathbb{R}^{d \times T} \to \mathbb{R}$ is a convex loss function, $\|\;\|_*^2$ is a nuclear norm regularizer, $\lambda > 0$ is a cost parameter and D is a set of constraints. The W matrix is a low rank matrix that is learnt by solving the following optimization problem, in one embodiment:

$$\min_{W \in \mathbb{R}^{d \times T}} \lambda L(Y, W) + \|W\|_*^2, \quad (1)$$

$$\text{subject to } W \in D$$

W can be factorized into customer and item embedding matrix denoted by E and M respectively. Embedding of a customer c is given by $E_c$. The customer embeddings learned using this method may then be used to learn attention weights for compatibility subspaces for the personalized compatibility model, in some embodiments. The loss function used in one embodiment is mean squared loss between the predicted ratings matrix W and actual rating matrix Y, and may be optimized using Riemannian conjugate gradient and trust-region algorithms, in some embodiments.

(b) Deep Neural Network for Recommendation

As mentioned above, StyNet or another deep neural-network based recommendation model may be configured to generalize to both cold-start customers and items by learning the interactions between customer and item features in a latent embedding space. In this architecture, customer embeddings and item embeddings are learnt through customer network and an item network respectively. A user identifier (an identifier for a specific customer), customer survey features and/or customer's past preferences via item feedback user interfaces may serve as the input layer to the customer neural network, while item catalog features like item ID, color, category, brand and/or item visual embeddings (which may be learned separately by a convolutional neural network or otherwise) may serve as the input layer to an item neural network. Two embeddings may be concatenated and a sigmoid function applied to the concatenated embedding to transform it into the predicted rating of an item. Such a network may be optimized in an end-to-end fashion using a mean squared loss, for example.

Subspace Attention Network—Additional Details

Below is further description of the machine learning framework, such as a personalized subspace attention network (PSA-Net), according to some embodiments. Instead of computing similarity in a single space, aspects of the architecture and associated processes may utilize style subspaces to capture multiple dimensions of compatibility. This is important in learning a personalized notion of compatibility for each customer or user.

In some embodiments, the network learns a non-linear function $\psi(I_s, c)$ that takes a source image Is and a customer embedding $E_c$ as inputs and generates a feature embedding f. The image is first passed through a convolutional neural network (CNN) or other machine learning model to extract its visual feature vector (denoted as X). The customer embedding is used to predict the subspace attention weights ($w_1, \ldots, w_k$) (k is the number of subspaces) using a sub-network, in some embodiments. Then, a set of learnable masks ($m_1, \ldots, m_k$) that have the same dimensionality as the image feature vector may be applied to the image feature vector, such as via Hadamard product. These masks are learned so as to project the features into a set of subspaces that encode different compatibility substructures. The final embedding constructed by the network may be a weighted sum of the subspace embeddings, such as:

$$f = \sum_{i=1}^{k} w_i * (X \odot m_i), \quad (2)$$

where k is the number of subspaces, X is the image feature vector after the base CNN, mi are learnable masks, wi are attention weights, and f is the final embedding.

Data Examples

While a clothing catalog typically includes multiple categories of items (e.g., shirts, jackets, hats, pants, dresses, etc.), examples above often describe tops (such as shirts and sweaters, designed to be worn generally on the upper body of a wearer) and bottoms (such as pants, jeans, skirts, and shorts, generally designed to be worn on the lower body of a wearer) as the categories of the two items considered as a pairing. However, it will be appreciated that aspects of the present disclosure are equally applicable to other categories of clothing. In addition, it will be appreciated that the systems and methods described herein may be extended to categories of items unrelated to clothing if the model is trained with training data for the appropriate item categories. For example, subjective item compatibility is relevant to areas outside of clothes, such as interior decorating (e.g., whether a pillow and couch go well together) and others.

Labelled Data from Human Stylists

The models described herein, in some embodiments, may be trained in part using an existing dataset of human stylists curated outfits. Since the task is to learn pairwise compatibility, the system may produce pairs from a curated outfits dataset. The system may not be able to use rejected outfits to generate negative pairs since some of those pairs can still be compatible even when the entire outfit is not. This data may be used to train a pairwise non-personalized compatibility model. This baseline model may be compared against a model trained on customer pairwise preference data from item and pairing feedback received from customers, for example.

Personalized Ratings Obtained from Customers

Preferences on pairs—Lack of negatively labelled data and the variance in compatibility labels provided by human stylists is one reason to collect pairwise compatibility data directly from customers to learn a compatibility metric personalized to them. In some embodiments, the system may obtain customer feedback on pairs of items through user interfaces where a customer upvotes a pair if they think they would wear the two items together and downvote it otherwise (such as via the user interface shown in FIG. 1B). The system may obtain data on pairs from each user (such as ~100 pairs, in one example). This data may be used to train the personalized compatibility model described herein.

Preferences on individual items—The system may collect data on customer style preferences on individual items through item feedback user interfaces described herein (such as via the user interface in FIG. 1A). For example, a customer may rate approximately 200 items to let the system know their style preferences. The system may use this data to learn customer embeddings that are used in the personalized compatibility model to learn subspace attention weights.

Preprocessing

Item images sometimes show a human model wearing pieces of clothing other than the item of interest, which might add noise to the training. To correct for this, images may be cropped before feeding into the models described herein. In one embodiment, a YOLO3 object detection model trained on a catalog's fashion images may identify the bounding boxes of all the entities (such as separate articles of clothing) present in the image, which may be used to extract the part of the image which represents the particular individual item.

Non-Limiting Sample Alternative Implementations

The models and framework described above have several components which can be altered or replaced in other embodiments. The effect of changing certain individual components, while keeping the rest as previously described, are described below.

Customer embeddings may be learned using customer ratings on individual items using two different methods, depending on the embodiment: Partial Dual and/or Stynet, as described above. Different customer representations could be learned from both these methods in computing attention weights of different subspaces. In some instances, using embeddings learnt from Partial Dual (a state of the art matrix completion algorithm) may lead to better performance in predicting personalized compatibility.

Contrastive loss works by moving the embeddings of complementary items closer together and those of non-complementary items farther apart. Alternatively, the system could use triplet loss for training the model. For calculating triplet loss, a triplet of images may be provided. Since the system may have ratings only on pairs of images, the third image may be sampled uniformly at random from all the images to generate a triplet, in some embodiments.

The masking operation may refer to calculating the final embedding by combining different subspace embeddings taking into account attention weights. In addition or as an alternative to the Hadamard masking operation, the system may use a fully connected layer to calculate the contribution of each subspace embedding, among other alternatives.

Example Computing System

Figure 5:
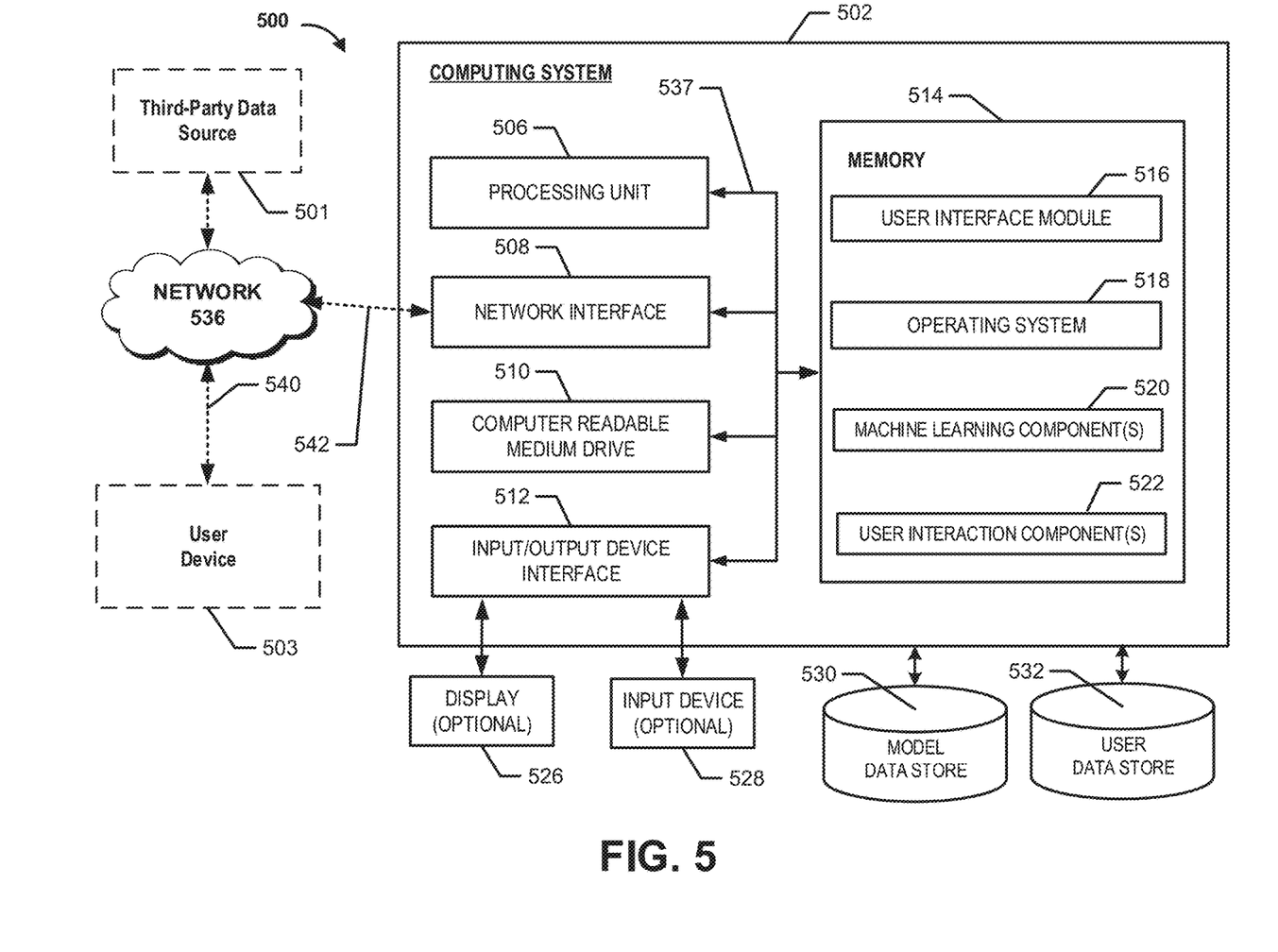
FIG. 5 is a block diagram depicting an illustrative architecture for a computing system that may implement one or more of the features described herein.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on the user device 503.

In some embodiments, the memory 514 may include one or more machine learning components 520 and user interaction components 522, which may be executed by the processing unit 506 to perform operations according to various embodiments described herein. The modules or components 520 and/or 522 may access the model data store 530 and/or user data store 532 in order to retrieve data described above and/or store data. The data stores 530 and/or 532 may be part of the computing system 502, remote from the computing system 502, and/or may be a network-based service.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional third-party data source 501, which may be used by the computing system 502 to retrieve item information, style data, stylist input, and/or other data.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
for each individual clothing item of a first plurality of clothing items:
generating a first user interface that includes an image of the individual clothing item and prompts a user for input regarding whether the user likes the individual clothing item; and
receiving, via user interaction with the first user interface, a first indication of whether the user likes the individual clothing item;
based at least in part on user input provided via the first user interface for the individual clothing items in the first plurality of clothing items, generating a user-specific embedding associated with the user for use within a machine learning model, wherein the machine learning model is trained to receive a proposed pair of clothing items and to output a predicted pairwise rating for the proposed pair of clothing items, wherein training data used in training the machine learning model includes feedback provided from a plurality of users with respect to clothing item pairs;
providing inputs to the machine learning model to generate a pairwise rating for a first clothing item and a second clothing item with respect to the user, wherein the inputs to the machine learning model comprise at least an image of the first clothing item and an image of the second clothing item;
generating, using the machine learning model, a plurality of subspace embeddings for each of the first clothing item and the second clothing item;
generating, using the machine learning model, a user-specific subspace embedding for each of the first clothing item and the second clothing item by weighting individual subspaces of the plurality of subspace embeddings based at least in part on the user-specific embedding;
generating, using the machine learning model, the pairwise rating representing user-specific compatibility of the first clothing item and the second clothing item being worn together, wherein the pairwise rating is specific to the user based at least in part on use of the user-specific subspace embedding for the first clothing item and the second clothing item; and
based at least in part on the pairwise rating, generating an outfit recommendation for presentation to the user, wherein the outfit recommendation suggests that the user wear the first clothing item and the second clothing item together.

2. The computer-implemented method of claim 1 further comprising:
for each pair of clothing items of a plurality of clothing item pairs:
generating a second user interface that includes one or more images depicting two individual clothing items as a pair, wherein the second user interface prompts the user to provide input regarding the pair of clothing items worn together; and
receiving, via user interaction with the second user interface, a second indication of whether the user considers the two individual clothing items compatible to wear together; and
training the machine learning model based at least in part on the second indication of whether the user considers the two individual clothing items compatible to wear together.

3. The computer-implemented method of claim 1, wherein generating the pairwise rating using the machine learning model further comprises:

passing the image of the first clothing item and the image of the second clothing item through a convolutional neural network to extract image feature vectors; and applying masks to the image feature vectors to generate a plurality of subspace embeddings.

4. The computer-implemented method of claim 1, wherein generating the pairwise rating using the machine learning model further comprises:

generating subspace attention weights based at least in part on the user-specific embedding; and generating a final embedding as a weighted sum of the plurality of subspace embeddings based in part on the subspace attention weights.

5. A system comprising:

a non-transitory data store; and at least one computing device configured with computer-executable instructions that, when executed, cause the at least one computing device to:

obtain item rating information for a first plurality of clothing items, wherein the item rating information is specific to a user and indicates whether the user likes individual clothing items in the first plurality of clothing items;

based at least in part on the item rating information, generate a user-specific embedding associated with the user for use within a machine learning model, wherein the machine learning model is trained to receive a proposed pair of clothing items and to output a predicted pairwise rating for the proposed pair of clothing items;

provide inputs to the machine learning model to generate a pairwise rating for a first clothing item and a second clothing item with respect to the user, wherein the inputs to the machine learning model comprise at least one of (a) an image of the first clothing item and an image of the second clothing item or (b) features representing the first clothing item and features representing the second clothing item;

generate, using the machine learning model, a plurality of subspace embeddings for each of the first clothing item and the second clothing item;

generate, using the machine learning model, a user-specific subspace embedding for each of the first clothing item and the second clothing item based at least in part on the plurality of subspace embeddings and the user-specific embedding;

generate, using the machine learning model, the pairwise rating for the first clothing item and the second clothing item with respect to the user, wherein the pairwise rating is specific to the user based at least in part on use of the user-specific subspace embedding within the machine learning model and represents user-specific compatibility of the first clothing item and the second clothing item being worn together; and based at least in part on the pairwise rating, generate a recommended outfit for the user, wherein the recommended outfit includes the first clothing item and the second clothing item.

6. The system of claim 5, wherein the user-specific embedding is generated by applying matrix factorization with respect to at least the item rating information for the first plurality of clothing items.

7. The system of claim 5, wherein the pairwise rating reflects both (a) whether the user is predicted by the machine learning model to like the first clothing item and the second clothing item individually and (b) whether the user is predicted by the machine learning model to consider the first clothing item and the second clothing item compatible for wearing together with one another.

8. The system of claim 5, wherein the computer-executable instructions, when executed, further cause the at least one computing device to:

generate the features representing the first clothing item and the features representing the second clothing item using a convolutional neural network.

9. The system of claim 8, wherein the convolutional neural network separately (a) generates the features representing the first clothing item based on image data of the image of the first clothing item, and (b) generates the features representing the second clothing item based on image data of the image of the second clothing item.

10. The system of claim 5, wherein the item rating information for an individual item in the first plurality of clothing items comprises a binary indication of whether the user indicated like or dislike for the individual item.

11. The system of claim 5, wherein the item rating information for an individual item in the first plurality of clothing items comprises a numeric value indicating an extent to which the user likes the individual item.

12. The system of claim 5, wherein the computer-executable instructions, when executed, further cause the at least one computing device to, in association with the generating of the pairwise rating:

generate subspace attention weights based at least in part on the user-specific embedding; and generate a final embedding for the first clothing item and the second clothing item as a weighted sum of the plurality of subspace embeddings based in part on the subspace attention weights.

13. A computer-implemented method comprising:

obtaining item rating information for a first plurality of clothing items, wherein the item rating information is specific to a user and indicates whether the user likes individual clothing items in the first plurality of clothing items;

based at least in part on the item rating information, generating a user-specific embedding associated with the user for use within a machine learning model, wherein the machine learning model is trained to receive a proposed pair of clothing items and to output a predicted pairwise rating for the proposed pair of clothing items;

providing inputs to the machine learning model to generate a pairwise rating for a first clothing item and a second clothing item with respect to the user, wherein the inputs to the machine learning model comprise at least one of (a) an image of the first clothing item and an image of the second clothing item or (b) features representing the first clothing item and features representing the second clothing item;

generating, using the machine learning model, a plurality of subspace embeddings for each of the first clothing item and the second clothing item;

generating, using the machine learning model, a user-specific subspace embedding for each of the first clothing item and the second clothing item based at least in part on the plurality of subspace embeddings and the user-specific embedding; and generating, using the machine learning model, the pairwise rating for the first clothing item and the second clothing item with respect to the user, wherein the pairwise rating is specific to the user based at least in part on use of the user-specific subspace embedding within the machine learning model and represents user-specific compatibility of the first clothing item and the second clothing item being worn together.

14. The computer-implemented method of claim 13, further comprising training the machine learning model based in part on feedback provided from a plurality of users with respect to clothing item pairs, wherein the feedback provided from the plurality of users indicates whether individual users believe that two items in each individual pair of clothing items in the clothing item pairs are compatible with each other for wearing together.

15. The computer-implemented method of claim 13, wherein the first clothing item is designed to be worn on at least a portion of a top half of a human body and the second clothing item is designed to be worn on at least a portion of a lower half of the human body.

16. The computer-implemented method of claim 13, further comprising, based at least in part on the pairwise rating, generating a recommended outfit for the user, wherein the recommended outfit includes the first clothing item and the second clothing item.

17. The computer-implemented method of claim 13, further comprising, based at least in part on the pairwise rating, identifying the first clothing item and the second clothing item as items for inclusion in a package to be shipped to the user in association with a personalized shopping program.

18. The computer-implemented method of claim 13, wherein generating the pairwise rating using the machine learning model further comprises:

generating subspace attention weights based at least in part on the user-specific embedding; and generating a final embedding as a weighted sum of the plurality of subspace embeddings based in part on the subspace attention weights.

* * * * *